US011755369B2

(12) United States Patent
Doudali et al.

(10) Patent No.: US 11,755,369 B2
(45) Date of Patent: *Sep. 12, 2023

(54) TECHNIQUES FOR CONTAINER SCHEDULING IN A VIRTUAL ENVIRONMENT

(71) Applicant: VMware, Inc., Palo Alto, CA (US)

(72) Inventors: Thaleia Dimitra Doudali, Atlanta, GA (US); Zhelong Pan, Cupertino, CA (US); Pranshu Jain, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/479,887

(22) Filed: Sep. 20, 2021

(65) Prior Publication Data

US 2022/0004431 A1    Jan. 6, 2022

Related U.S. Application Data

(63) Continuation of application No. 16/034,126, filed on Jul. 12, 2018, now Pat. No. 11,126,461.

(51) Int. Cl.
*G06F 9/48* (2006.01)
*G06F 9/455* (2018.01)
*G06F 9/50* (2006.01)

(52) U.S. Cl.
CPC ............ *G06F 9/4881* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/45562; G06F 9/48;
(Continued)

(56) References Cited

U.S. PATENT DOCUMENTS

2012/0060171 A1   3/2012  Bobroff et al.
2013/0346966 A1  12/2013  Natu et al.
(Continued)

OTHER PUBLICATIONS

Guo et al, "A Container Scheduling Strategy Based on Neighborhood Division in Micro Service", 978-1-5386-3416-5/18/, May 2018 IEEE, pp. 1-6 (Year: 2018).*
(Continued)

*Primary Examiner* — Charles M Swift
(74) *Attorney, Agent, or Firm* — DLA Piper LLP (US)

(57) ABSTRACT

The present disclosure relates generally to virtualization, and more particularly to techniques for deploying containers in a virtual environment. The container scheduling can be based on information determined by a virtual machine scheduler. For example, a container scheduler can receive a request to deploy a container. The container scheduler can send container information to the virtual machine scheduler. The virtual machine scheduler can use the container information along with resource utilization of one or more virtual machines to determine an optimal virtual machine for the container. The virtual machine scheduler can send an identification of the optimal virtual machine back to the container scheduler so that the container scheduler can deploy the container on the optimal virtual machine.

19 Claims, 6 Drawing Sheets

(52) U.S. Cl.
CPC ............ *G06F 9/45558* (2013.01); *G06F 9/48* (2013.01); *G06F 9/485* (2013.01); *G06F 9/4843* (2013.01); *G06F 9/50* (2013.01); *G06F 9/5005* (2013.01); *G06F 9/5011* (2013.01); *G06F 9/5061* (2013.01); *G06F 9/5077* (2013.01); *G06F 9/5083* (2013.01); *G06F 2009/4557* (2013.01); *G06F 2009/45562* (2013.01)

(58) Field of Classification Search
CPC ...... G06F 9/4843; G06F 9/485; G06F 9/4881; G06F 9/50; G06F 9/5005; G06F 9/5011; G06F 9/5027; G06F 9/5061; G06F 9/5077; G06F 9/5083
See application file for complete search history.

(56) References Cited

U.S. PATENT DOCUMENTS

| | | |
|---|---|---|
| 2015/0120928 A1 | 4/2015 | Gummaraju et al. |
| 2015/0277791 A1 | 10/2015 | Li et al. |
| 2016/0092252 A1 | 3/2016 | Wagner |
| 2016/0205518 A1 | 7/2016 | Patel et al. |
| 2016/0277249 A1 | 9/2016 | Singh et al. |
| 2016/0378517 A1 | 12/2016 | Zellermayer et al. |
| 2017/0060707 A1 | 3/2017 | Harper et al. |
| 2017/0063722 A1 | 3/2017 | Cropper et al. |
| 2017/0111236 A1 | 4/2017 | Bielenberg et al. |
| 2017/0200102 A1 | 7/2017 | Kapasi et al. |
| 2018/0074855 A1 | 3/2018 | Kambatla |
| 2018/0285166 A1 | 10/2018 | Roy et al. |
| 2020/0012510 A1* | 1/2020 | Andrianov .......... G06F 9/45558 |

OTHER PUBLICATIONS

Final Office Action received for U.S. Appl. No. 16/034,126, dated Jul. 27, 2020, 20 pages.
Kubernetes Engine, "Containerized Application Management at Scale", Google Cloud, Available at: https://cloud.google.com/kubernetes-engine/, 2018, pp. 1-8.
Mesos Architecture, Apache Software Foundation, Available at: http://mesos.apache.org/documentation/latest/architecture/, 2012-2018, pp. 1-2.
Non-Final Office Action received for U.S. Appl. No. 16/034,126, dated Dec. 28, 2020, 18 pages.
Non-Final Office Action received for U.S. Appl. No. 16/034,126, dated Jan. 17, 2020, 18 pages.
Notice of Allowance received for U.S. Appl. No. 16/034,126, dated May 18, 2021, 9 pages.
Swarm Mode Overview, Docker Documentation, Available at: https://docs.docker.com/engine/swarm/, 2018, pp. 1-3.

* cited by examiner

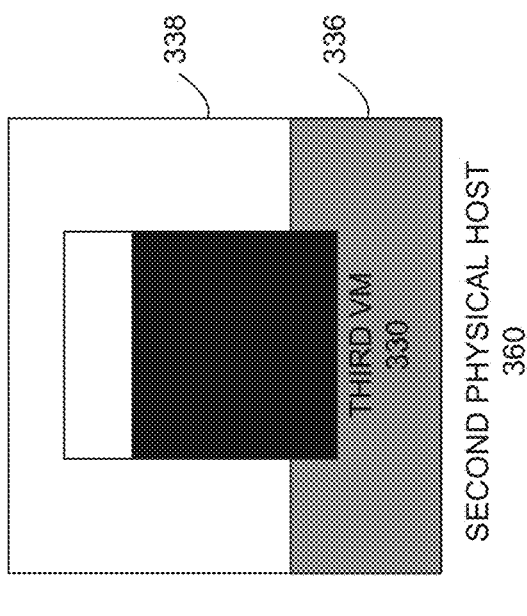
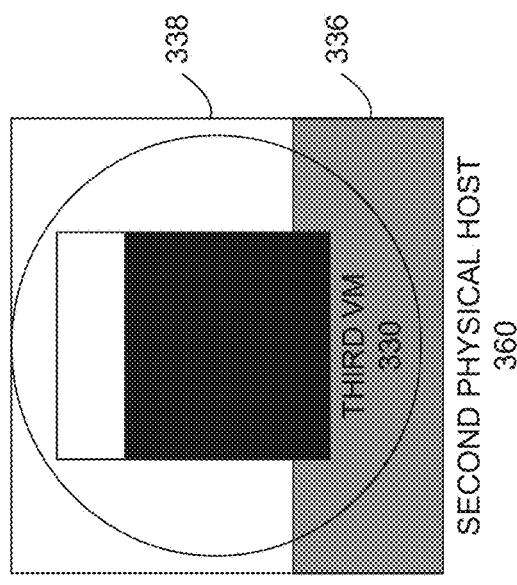
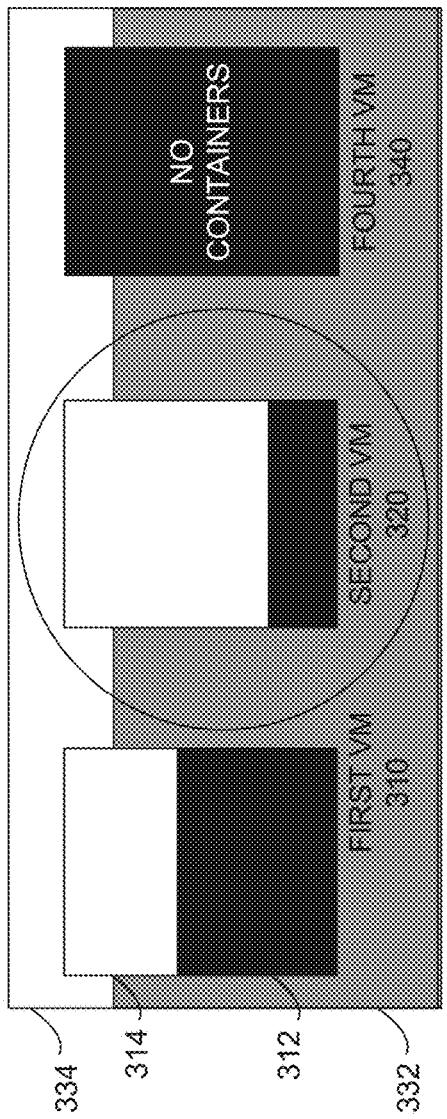
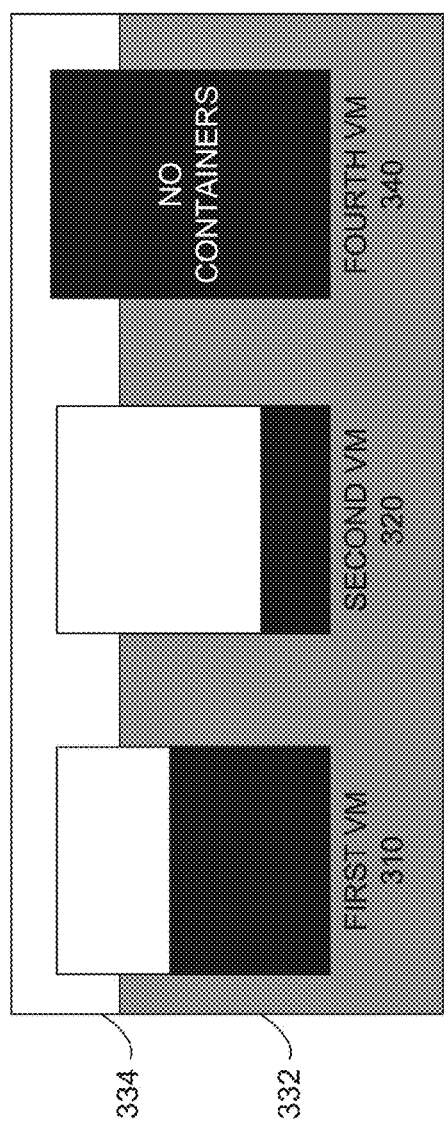
FIG. 3A
FIG. 3B

TECHNIQUES FOR CONTAINER SCHEDULING IN A VIRTUAL ENVIRONMENT

CROSS-REFERENCE TO RELATED APPLICATIONS

This application is a continuation of U.S. patent application Ser. No. 16/034,126, entitled "TECHNIQUES FOR CONTAINER SCHEDULING IN A VIRTUAL ENVIRONMENT," filed Jul. 12, 2018, the contents of which are hereby incorporated by reference in its entirety for all purposes.

BACKGROUND

Virtualization enables workloads to be executed in environments separated from their underlying hardware by one or more intermediate software layers. While different techniques can be used to accomplish this abstraction, two notable examples of current virtualization technologies include virtual machines and containers. Such virtualization technologies can be run on physical hosts. For example, a cluster of physical hosts can run a first workload as containers and a second workload as virtual machines. Moreover, containers can be deployed either directly on a physical host, or inside a virtual machine that is running on a physical host. Due to such complex deployments, scheduling processes used for deploying and managing containers sometimes fail to optimally utilize resource, due at least partially to limited information known by the scheduling processes.

SUMMARY

The present disclosure relates generally to virtualization and more particularly to techniques for scheduling deployment of containers in a virtual environment. Unlike many existing solutions, container scheduling, as described herein, can be based on resource utilization data of physical hosts (e.g., usage of the physical hosts, topology of the physical hosts in a cluster, and resource utilization of other virtual machines that are running conventional workloads and are not being used for deploying containers), thereby improving resource management.

In certain embodiments, a container scheduler is provided. The container scheduler can receive a request to deploy a container. In response to the request, the container scheduler can (1) apply user-defined constrains and policies to identify an initial candidate list of virtual machines for where to deploy the container and (2) send information (e.g., container information) to a virtual machine scheduler (sometimes referred to as an infrastructure scheduler, which can be responsible for scheduling virtual machines based on a cluster's resources). In some embodiments, the information includes a list of one or more virtual machines on which the container can be deployed. In such embodiments, the information can further include (1) resource requirements of the container to be scheduled and (2) policies configured for the container to be scheduled (e.g., a policy indicating that a particular container should be (1) run on a physical host with a particular label or (2) not run on a physical host that already has another container of the same type or another container with a particular label).

In some embodiments, the virtual machine scheduler can use the information provided by the container scheduler, along with resource utilization data (e.g., usage data) for one or more physical hosts (and, optionally, resource utilization data for other virtual machines), to identify one or more candidate virtual machines (e.g., a most optimal virtual machine) for deployment of the container. By way of example, the virtual machine scheduler can identify the one or more candidate virtual machines based on the resource requirements of the container, optionally, while accounting for efficient distribution of resources across all virtual machines and underlying physical hosts available for deployment of the container. The resulting two stage scheduling can also exclude any virtual machine running on any physical host where a replica of the container to be scheduled is already deployed. This ensures improved high availability of the application with respect to not only virtual machine failures, but possible physical host failures as well.

The virtual machine scheduler can send an identification of the one or more candidate virtual machines to the container scheduler so that the container scheduler can deploy the requested container on a virtual machine of the one or more candidate virtual machines.

Techniques described herein can be provided as a system, method, or a non-transitory computer readable medium. For example, a system of one or more computing systems can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

An example method includes receiving, from a first scheduling process by a second scheduling process, first information identifying a plurality of virtual machines executing on a plurality of physical hosts. The method also includes determining resource utilization data for each physical host of the plurality of physical hosts. The method also includes identifying, based on the resource utilization data and the first information, a virtual machine of the plurality of virtual machines. The method also includes sending, by the second scheduling process to the first scheduling process, second information to cause the first scheduling process to cause a container to be deployed on a virtual machine of the plurality of virtual machines based on the second information, where the second information identifies the identified virtual machine. Other embodiments of this aspect include corresponding computing systems, apparatus, and computer programs recorded on one or more computer storage devices, each configured to perform the actions of the methods.

Implementations of the method described above can include one or more of the following features. Implementations of the described techniques can include hardware, a method or process, or computer software stored on a computer-accessible medium.

In some examples, the first scheduling process is a container scheduling process and the second scheduling process is a virtual machine scheduling process. However, it should be recognized that the first scheduling process can be the virtual machine scheduling process and the second scheduling process can be the container scheduling process.

The first information can include a resource requirement of a container to be deployed, a policy associated with the first scheduling process, a ranking of the plurality of virtual machines, or any combination thereof. The policy associated with the first scheduling process can relate to identifying a virtual machine to be used to deploy a container. The ranking can be determined by the first scheduling process.

The second information can further identify one or more other virtual machines, the one or more other virtual machines identified as candidates on which to deploy a container. When identifying other virtual machines, the second information can include a ranking of the identified virtual machine and the one or more other identified virtual machines based on information associated with a physical host.

The plurality of virtual machines can be identified by the first scheduling process. The second scheduling process can be executing on a virtual machine separate from the plurality of virtual machines. The virtual machine executing the second scheduling process can execute on a physical host separate from the plurality of physical hosts. The second scheduling process can execute on a virtual machine of the plurality of virtual machines.

The method can further include: identifying, based on the resource utilization data, a physical host of the plurality of physical hosts, where identifying the virtual machine is further based on the identified physical host. Each of the plurality of virtual machines can be configured to execute one or more containers.

DESCRIPTION OF THE FIGURES

For a better understanding of the various described embodiments, reference should be made to the Detailed Description below, in conjunction with the following drawings in which like reference numerals refer to corresponding parts throughout the figures.

FIGS. 3A-3B depict an exemplary use case for efficient resource management according to certain embodiments described herein.

DETAILED DESCRIPTION

The following description sets forth exemplary methods, parameters, and the like. It should be recognized, however, that such description is not intended as a limitation on the scope of the present disclosure but is instead provided as a description of exemplary embodiments.

Techniques are provided herein for deploying (e.g., injecting) containers in a virtual environment. Such techniques can be based on resource utilization data (e.g., real-time resource utilization data) (e.g., usage of the physical hosts, topology of the physical hosts in a cluster, and resource utilization of other virtual machines that are running conventional workloads and are not being used for deploying containers) of underlying physical hosts, thereby improving resource management, as discussed further below.

In certain embodiments, a container scheduler is provided. The container scheduler can receive a request to deploy a container. In response to the request, the container scheduler can (1) apply user-defined constraints and policies to identify an initial candidate list of virtual machines for where to deploy the container and (2) send information (e.g., container information) to a virtual machine scheduler (sometimes referred to as an infrastructure scheduler, which can be responsible for scheduling virtual machines based on a cluster's resources). Examples of information provided in this manner include resource requirements of the requested container (e.g., included in the request), a list of virtual machines on which existing containers are executing (e.g., determined by the container scheduler), one or more policies related to container deployment (known to the container scheduler), or any combination thereof. As used herein, "executing" can mean "configured to execute."

In some embodiments, the virtual machine scheduler can use the received information, along with resource utilization data for one or more physical hosts (and, optionally, resource utilization data for other virtual machines), to identify one or more candidate virtual machines (e.g., a most optimal virtual machine) for deployment of the container. By way of example, the virtual machine scheduler can identify the one or more candidate virtual machines based on the resource requirements of the container, optionally, while striving for an efficient distribution of resources across all virtual machines available and underlying physical hosts for deployment of the container. The resulting two stage scheduling can also exclude any virtual machine running on any physical host where a replica of the container to be scheduled is already deployed. This ensures improved high availability of the application with respect to not only virtual machine failures, but possible physical host failures as well.

Figure 1:
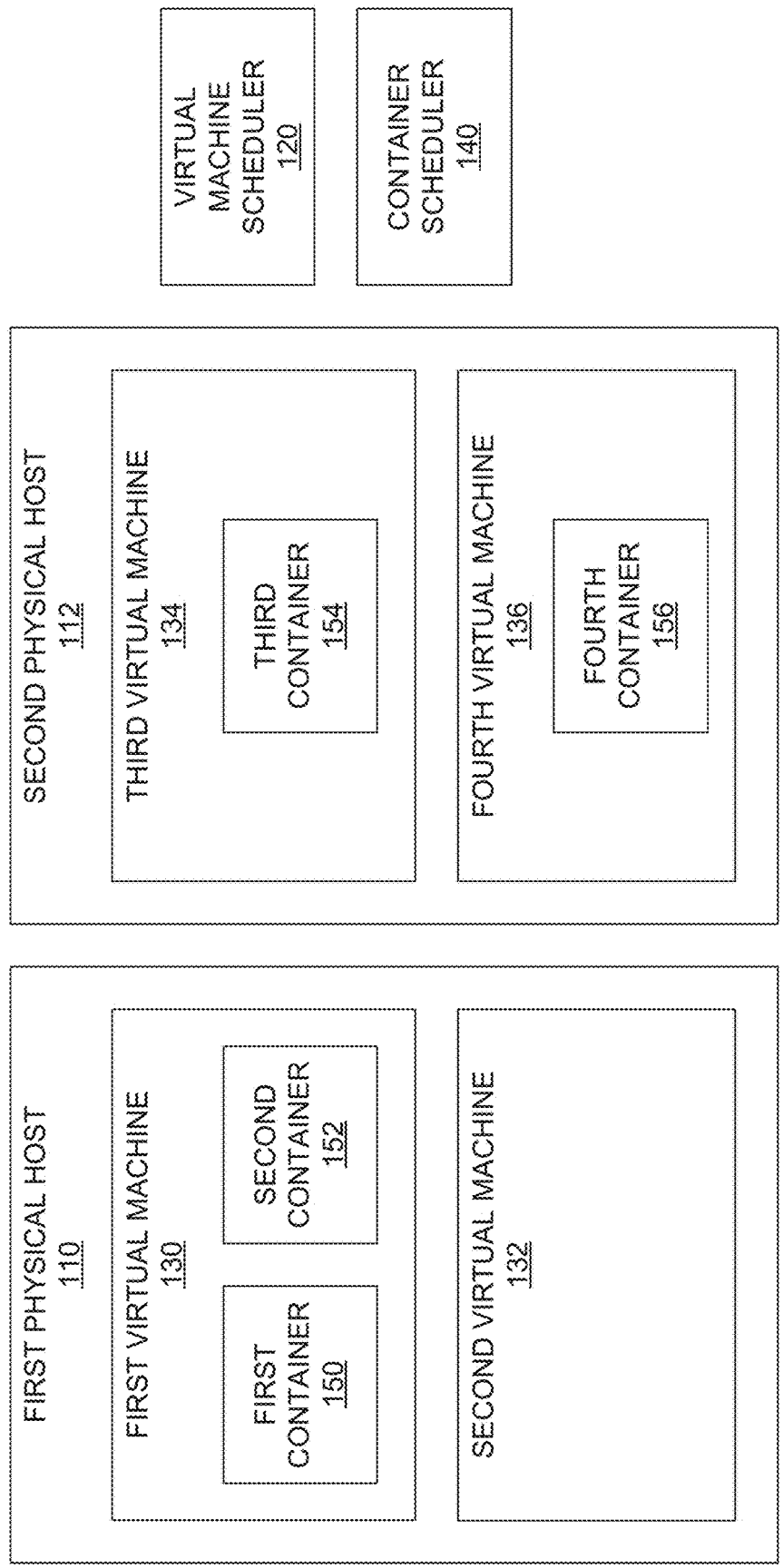
FIG. 1 depicts a distributed virtualization system according to certain embodiments described herein.

FIG. 1 depicts distributed virtualization system 100 according to certain embodiments described herein. Distributed virtualization system 100 includes multiple physical hosts (e.g., first physical host 110 and second physical host 112). An example physical host is depicted as physical host 600 in FIG. 6, described in further detail below.

In some examples, a physical host can execute one or more virtual machines (e.g., first virtual machine 130, second virtual machine 132, and third virtual machine 134), where a virtual machine is an emulation of a physical host (e.g., physical host 600 as described below for FIG. 6).

With virtual machines, a software component, or hypervisor, acts as an intermediary between the virtual machine environment and the underlying hardware, providing a layer of abstraction. In some examples, such as in a server context, virtual machines can execute using a hypervisor, which can run either directly on bare hardware (type 1 hypervisor) or in combination with an operating system of a host (type 2 hypervisor). In some examples, multiple virtual machines execute simultaneously on the same physical host. By way of example, first virtual machine 130 and second virtual machine 132 can execute on first physical host 110.

Distributed virtualization system 100 also includes containers (e.g., first container 150, second container 152, third container 154, and fourth container 156). It should be recognized that there can be more or fewer containers in other examples. A container can execute on a virtual machine, such as one or more of the multiple virtual machines depicted in FIG. 1.

In the example depicted in FIG. 1, first physical host 110 executes first virtual machine 130, which in turn executes first container 150 and second container 152. First physical host 110 also executes second virtual machine 132, which does not execute any containers.

Second physical host 112 executes third virtual machine 134, which in turn executes third container 154. Second physical host 112 also executes fourth container 156, which in turn executes fourth container 156. In other examples, fourth container 156 can execute directly on second physical host 112 such that the fourth container 156 does not execute in the virtualized environment provided by fourth virtual machine 136.

It should be recognized that distributed virtualization system 100 may employ other configurations in some examples. By way of example, distributed virtualization system 100 may include one or more additional hosts and/or may span multiple physical locations (e.g., multiple data centers).

In some embodiments, distributed virtualization system 100 also includes virtual machine scheduler 120 (e.g., a virtual machine management process) for managing virtual machines of distributed virtualization system 100. In some examples, managing virtual machines includes but is not limited to migrating, creating, and/or removing virtual machines within distributed virtualization system 100. In some examples, virtual machine scheduler 120 can manage virtual machines of distributed virtualization system 100 such that the resource consumption is optimized (e.g., load balanced) across physical hosts (e.g., 110, 112) of distributed virtualization system 100.

It should be recognized that, in some examples, virtual machine scheduler 120 can execute at the container, virtual machine, or host level. Further, in some examples, virtual machine scheduler 120 can execute on a physical host (e.g., physical host 110, physical host 112) of distributed virtualization system 100 (or a container or virtual machine executing thereon). In other examples, virtual machine scheduler 120 can execute on a physical host not included in distributed virtualization system 100.

In some embodiments, distributed virtualization system 100 also includes container scheduler 140 (e.g., a container management process) for managing containers of distributed virtualization system 100. Managing containers in this manner can include creating and/or removing containers within distributed virtualization system 100. In some examples, container scheduler 140 determines resource utilization data of virtual machines in distributed virtualization system 100 and optimizes (e.g., load balances) resource utilization of the virtual machines to optimize execution of containers of distributed virtualization system 100.

In some examples, container scheduler 140 determines resource utilization data for only virtual machines executing one or more containers. Accordingly, container scheduler 140 does not take into account resource utilization data for virtual machines not executing a container (e.g., second virtual machine 132).

Container scheduler 140, in some examples, is limited in its ability to optimally manage containers of distributed virtualization system 100. By way of example, because the container scheduler 140 cannot determine resource utilization data for all virtual machines (recall that the container scheduler determines resource usage only for virtual machines executing a container), container scheduler 140 cannot properly determine resource utilization data for physical hosts of distributed virtualization system 100. With reference to FIG. 1, for example, container scheduler 140 cannot determine resource utilization data for virtual machine 132, and as a result, cannot properly determine resource usage for physical host 110. As a result of this limitation, container scheduler 140 can, in some instances, schedule containers on highly loaded physical hosts. As will be described in more detail below, by evaluating resource utilization data using each of a container scheduler and a virtual machine scheduler, the container scheduler can be enabled to manage containers in an optimized manner.

It should be recognized that, in some examples, container scheduler 140 can execute at the container, virtual machine, or host level. Further, in some examples, container scheduler 140 executes on a physical host of distributed virtualization system 100 (or a container or virtual machine executing thereon). In other examples, container scheduler 140 executes on a physical host not included in distributed virtualization system 100 (or a container or virtual machine executing thereon).

Figure 2:
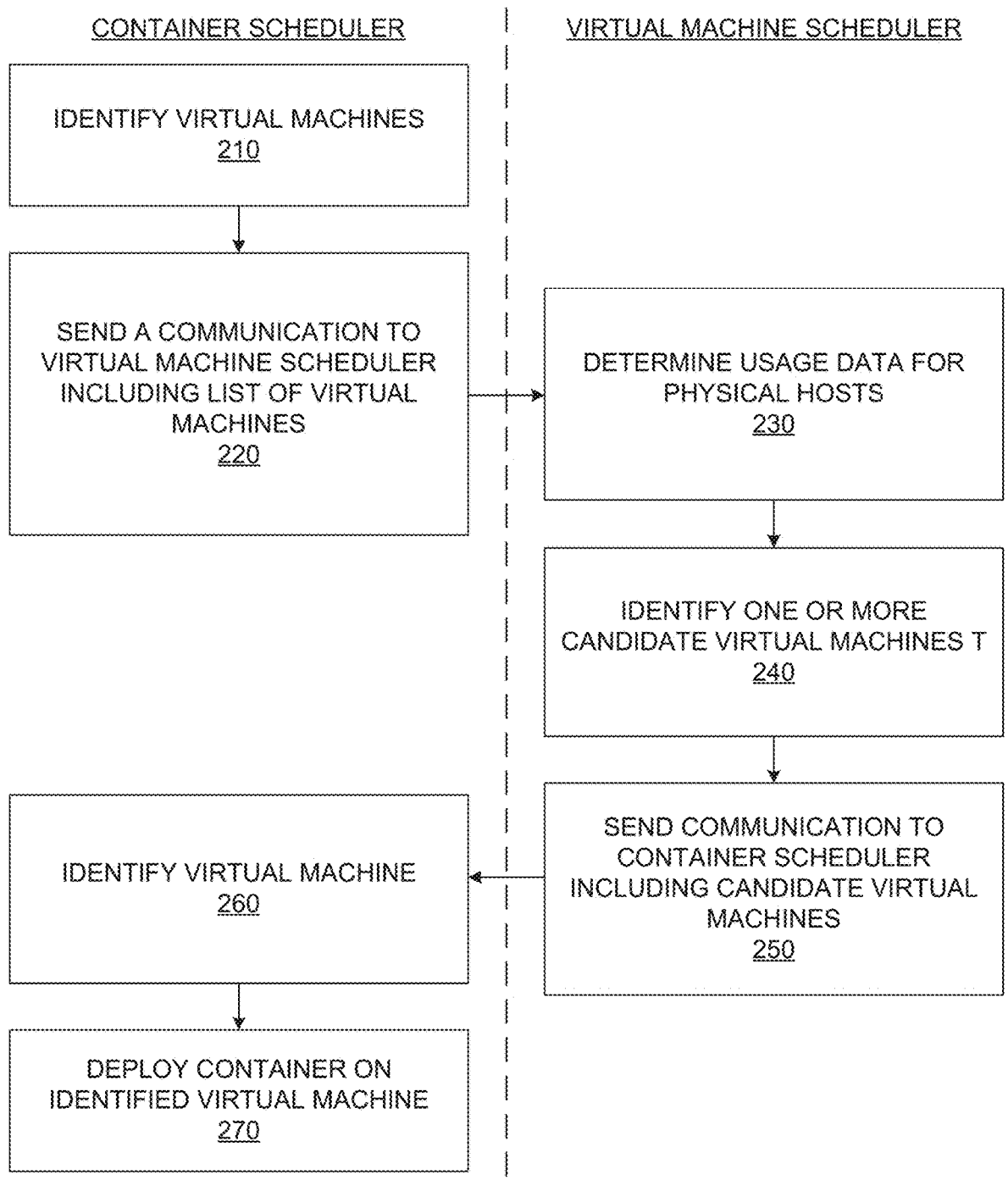
FIG. 2 depicts a flow diagram for deploying a container according to certain embodiments described herein.

FIG. 2 depicts a flow diagram for deploying a container according to certain embodiments described herein. The processing depicted in FIG. 2 can be implemented in software (e.g., code, instructions, program, or the like) executed by one or more processing units (e.g., processor cores), in hardware, or combinations thereof. The software can be stored on a non-transitory computer readable medium (e.g., a storage device, memory, or the like). The particular series of processing operations depicted in FIG. 2 is not intended to be limiting. In at least one embodiment, the processing depicted in FIG. 2 is performed by one or more components of distributed virtualization system 100 as depicted in FIG. 1.

In some examples, the operations depicted in FIG. 2 are implemented using a two-stage scheduling process that enables efficient resource management of containers and virtual machines.

In an example operation, a container scheduler identifies virtual machines on which to deploy a container (210). The identification can be based on container information, or information known (or determined) by the container scheduler. In some examples, container information includes a resource requirement of the container, virtual machines executing containers (recall that in some examples the container scheduler determines resource utilization data only for virtual machines executing one or more containers), virtual machines that are assigned to the container scheduler (recall that in some examples the container scheduler determines resource utilization data only for virtual machines assigned to the container scheduler such as in a multi-tenant system), or any combination thereof.

In some examples, the container information can be used in combination with one or more policies associated with the container scheduler to identify the virtual machines. Example policies associated with the container scheduler include policies directed to load balancing containers among virtual machines, consolidating containers among virtual machines (to deploy containers on as few virtual machines as possible, sometimes referred to as bin packing), grouping containers by type (such as deploying similar types of containers on the same or different virtual machines), distributing containers among a predetermined number of containers (to increase process availability), or any combination thereof. In some examples, the virtual machines can be ranked in an order of most desirable to least desirable (in regards to a best virtual machine for a new container). The container scheduler can provide the list of the virtual machines and resource requirements for the container to the virtual machine scheduler (220).

In some examples, the virtual machine scheduler can determine resource utilization data for physical hosts (230). In some examples, the virtual machine scheduler can determine resource utilization data periodically, without reference to when communications are received. In other examples, the virtual machine scheduler can determine resource utilization data in response to receiving the list of virtual machines from the container scheduler.

In some examples, the resource utilization data may indicate consumption of one or more different types of resources, such as processing, memory, storage, network bandwidth resources. For example, the resource utilization data may indicate a percentage of each type of resource used (or unused) for each physical host. In some examples, the resulting percentages can be combined to produce the resource utilization data for a physical host. In other examples, the resulting percentages can be associated with respective weights such that some types of resources are weighted more than others. While the above describes resource utilization data in terms of percentages, it should be recognized that the resource utilization data can indicate amount of used (or unused) resources, rather than, or in addition to, percentages. For example, rather than indicating 50% of memory is being used, the resource utilization data can indicate that there is 1 GB of unused memory out of 2 GB total memory. In some examples, the resource utilization data further indicates which containers are deployed on which virtual machines and/or physical hosts, respectively.

Based on the resource utilization data, the virtual machine scheduler can identify one or more candidate virtual machines on which to deploy the container (240). For example, a physical host with a lowest usage can be determined to be a candidate virtual machine. For another example, a number of physical hosts below a resource usage threshold can be determined to be candidate virtual machines. In such an example, the candidate virtual machines can be ordered based on their associated resource utilization data (e.g., ranked by total available resources). It should be recognized that candidate virtual machines can be ordered in other ways. Candidate virtual machines can be ordered, for instance, based on availability of a specific type of resource (e.g., memory).

In response to identifying a set of candidate virtual machines, the virtual machine scheduler can send a list to the container scheduler identifying the set (e.g., list) of candidate virtual machines (250). In some examples, candidate virtual machines provided in this manner are ordered (e.g., ranked). In some examples, the list provided includes only a single candidate virtual machine.

In response to receiving the list of candidate virtual machines from the virtual machine scheduler, the container scheduler can identify a virtual machine from the set of candidate virtual machines (260).

In some examples, once the container scheduler has identified a virtual machine, the container scheduler can deploy the container on the identified virtual machine (270). For example, the container scheduler can cause the container to begin executing on the identified virtual machine. In some examples, deploying can include updating an already existing container. For example, the container scheduler can modify an already existing container to execute a different application from an application that the already existing container is currently executing. In some examples, deploying can include resuming execution of a suspended or otherwise inactive container.

FIGS. 3A-3B depict a use case for efficient resource management according to certain embodiments described herein. In particular, FIG. 3A depicts a scheduling decision using only a single scheduling process (e.g., a container scheduler). FIG. 3B depicts a scheduling decision using multiple scheduling processes (e.g., a container scheduler and a virtual machine scheduler).

In FIG. 3A, multiple physical hosts are depicted (e.g., first physical host 350 and second physical host 360). First physical host 350 is executing first VM 310, second VM 320, and fourth VM 340. First VM 310 and second VM 320 execute containers and fourth VM 340 does not execute containers in some examples. Second physical host 360 is executing third VM 330. Third VM 330 executes containers in some examples.

Each virtual machine is depicted as having a respective load (e.g., load 312 of virtual machine 310) and a respective amount of unused resources (e.g., unused resources 314 of virtual machine 310). Load 312 can represent a percentage of resources dedicated to a virtual machine that are currently being used by the virtual machine. Unused resources 314 can represent a percentage of resources of a virtual machine that are not being used by the virtual machine. For example, first VM 310 is depicted as using approximately 60% of resources dedicated to first VM 310.

When determining a virtual machine for deployment of a container, the scheduling process can determine resource utilization data for each of the three virtual machines 310-330, but not virtual machine 340 (recall that a container scheduler cannot determine resource utilization data for a VM not executing containers). The resource utilization data can indicate (1) the amount of resources consumed by each virtual machine 310-330 (e.g., as illustrated by load 312), (2) whether a virtual machine includes a replica of a container to be deployed, or (3) any combination thereof.

Based on the resource utilization data, the scheduling process can determine to deploy a new container on second VM 320, because second VM 320 is using less of its allocated resources than other virtual machines viewable by the scheduling process (e.g., VMs 310, 330). Such a decision may not be optimal as the load 332 of first physical host 350 is relatively high compared to the load 336 of second physical host 360.

FIG. 3B depicts a system analogous to that of FIG. 3A. In FIG. 3B, however, multiple scheduling processes are employed to deploy a container.

After identifying the one or more virtual machines (as described at least with reference to FIG. 3A), a first scheduling process (e.g., container scheduler 140 of FIG. 1) can provide (e.g., send) a list identifying each of the one or more virtual machines to a second scheduling process (e.g., virtual machine scheduler 120 of FIG. 1). In response to receiving the list, the second scheduling process can identify one or more physical hosts associated with (e.g., assigned to, dedicated to, running a virtual machine associated with) the first scheduling process that sent the list.

Thereafter, the second scheduling process can determine resource utilization data for each of the identified one or more physical hosts. Based on the resource utilization data, the second scheduling process can identify a physical host. For example, the second scheduling process can determine that second physical host 360 has a higher percentage of unused resources (or higher amount of unused resources) as compared to first physical host 350 and as a result is better suited for deployment of the requested container despite that the virtual machine executing on second physical host 360 has the greatest resource usage of the virtual machines visible to the first scheduling process. After identifying second physical host 360, the second scheduling process can either (1) identify a subset of the virtual machines executing on second physical host 360 or (2) identify each virtual machine running on second physical host 360. Identified virtual machines can be referred to as candidate virtual machines.

The second scheduling process can send a list to the first scheduling process including the one or more candidate virtual machines (and potentially a ranking as described above). Based on the list, the first scheduling process can identify a virtual machine on which to deploy a new container.

Figure 4A:
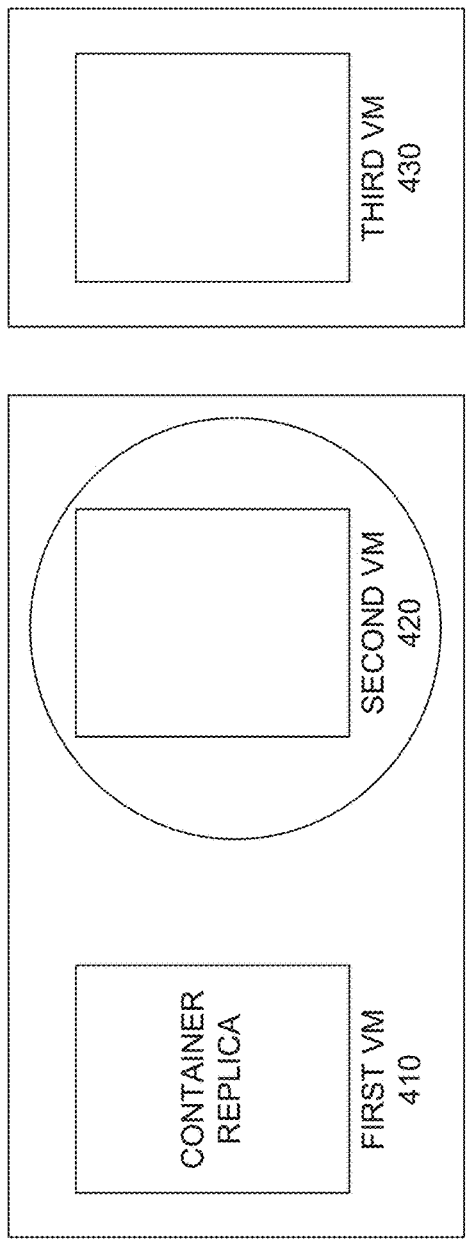
FIGS. 4A-4B depict an exemplary use case for ensuring high availability according to certain embodiments described herein.
Figure 4B:
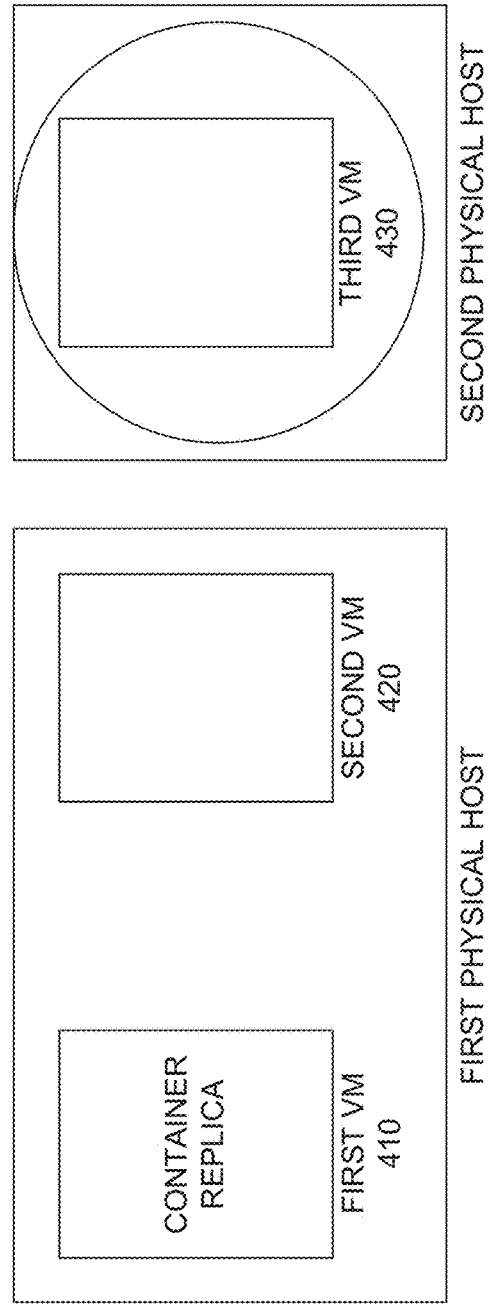

FIGS. 4A-4B depict an exemplary use case for ensuring high availability according to certain embodiments described herein. In particular, FIG. 4A depicts a scheduling decision that relies solely on a single scheduling process (e.g., a container scheduler) and FIG. 4B depicts a scheduling decision that replies on multiple scheduling processes (e.g., a container scheduler and a virtual machine scheduler).

In FIG. 4A, a first physical host 440 executes virtual machines 410, 420 and a second physical host 450 executes a third virtual machine 430. Each of the virtual machines 410-430 execute containers in some examples. First virtual machine 410 executes a same container as a requested container (illustrated in FIG. 4A as "container replica"). In some examples, the scheduling process managing containers of the system of FIG. 4A is configured to deploy containers such that a same virtual machine does not execute replica containers. This provides for high availability of any processes provided by the containers. In some examples, high availability allows for scheduling the requested container on a virtual machine that does not have its replica already running so that if a virtual machine fails, at least one instance of the requested container is still running. Thus, in operation, based on resource utilization data, the scheduling process can deploy a requested container on second VM 420 or third VM 430, because first VM 410 includes a replica of the container. The scheduling process may select the VM with the lowest resource usage, for instance.

FIG. 4B depicts a system analogous to that of FIG. 4A. In FIG. 4B, however, multiple scheduling processes are implemented. For example, a first scheduling process (e.g., a container scheduler) can identify one or more virtual machines that are associated with (e.g., assigned to, dedicated to, or running a container associated with) the first scheduling process and select one or more candidate VMs for a requested container (e.g., VMs 420, 430). In the example depicted in FIG. 4B, the first scheduling process can identify either (1) second VM 420 and third VM 430 (i.e., virtual machines that do not include a replica container) or (2) second VM 420 (i.e., a virtual machine chosen by the first scheduling process from a group (1) including second VM 420 and third VM 430 and (2) not including first VM 410). The first scheduling process can also identify that first VM 410 is running a replica of the container to be deployed. When identifying multiple virtual machines, the first scheduling process can also rank the multiple virtual machines based on one or more policies associated with the container to be scheduled, as described herein.

Thereafter, the first scheduling process can provide (e.g., send) a list of the identified one or more virtual machines to a second scheduling process (e.g., a virtual machine scheduler). In response to receiving the list, the second scheduling process can identify one or more physical hosts that are associated with (e.g., assigned to, dedicated to, running a virtual machine associated with) the first scheduling process. In some examples, all physical hosts associated with the second scheduling process can be assigned to the first scheduling process. In other examples, the one or more physical hosts can be identified based on which physical hosts are used for each of the virtual machines included in the list.

After identifying the one or more physical hosts, the second scheduling process can determine resource utilization data for each of the one or more physical hosts. The resource utilization data can indicate which physical hosts includes a virtual machine that includes a replica of the container. The resource utilization data can be related to virtual machines associated with a the first scheduling process, virtual machines not associated with the first scheduling process, and/or other processes/data either related or unrelated to running virtual machines or containers.

Based on the resource utilization data, the second scheduling process can identify a physical host. For example, the second scheduling process can determine that second physical host 450 does not include a virtual machine that includes a replica of the container. After identifying second physical host 450, the second scheduling process can either (1) identify one or more virtual machines running on second physical host 450 or (2) identify each virtual machine running on second physical host 450. Identified virtual machines can be referred to as candidate virtual machines.

The second scheduling process can send a list to the first scheduling process, including the candidate virtual machines (and potentially a ranking as described above). Based on the list, the first scheduling process can identify a virtual machine on which to deploy a new container. By selecting a host not executing a replica container, the scheduling processes, in combination, ensure that a requested container is deployed on a different host than that of the replica container. If, for instance, either of the hosts (or VMs or containers thereon) fail, at least one instance of the container will continue to execute.

While description is made herein with respect to first and second scheduling processes, it will be appreciated that, in some examples, operations (and variants thereof) may be implemented using any number of processes (e.g., a single scheduling process, three scheduling processes, etc.).

Figure 5:
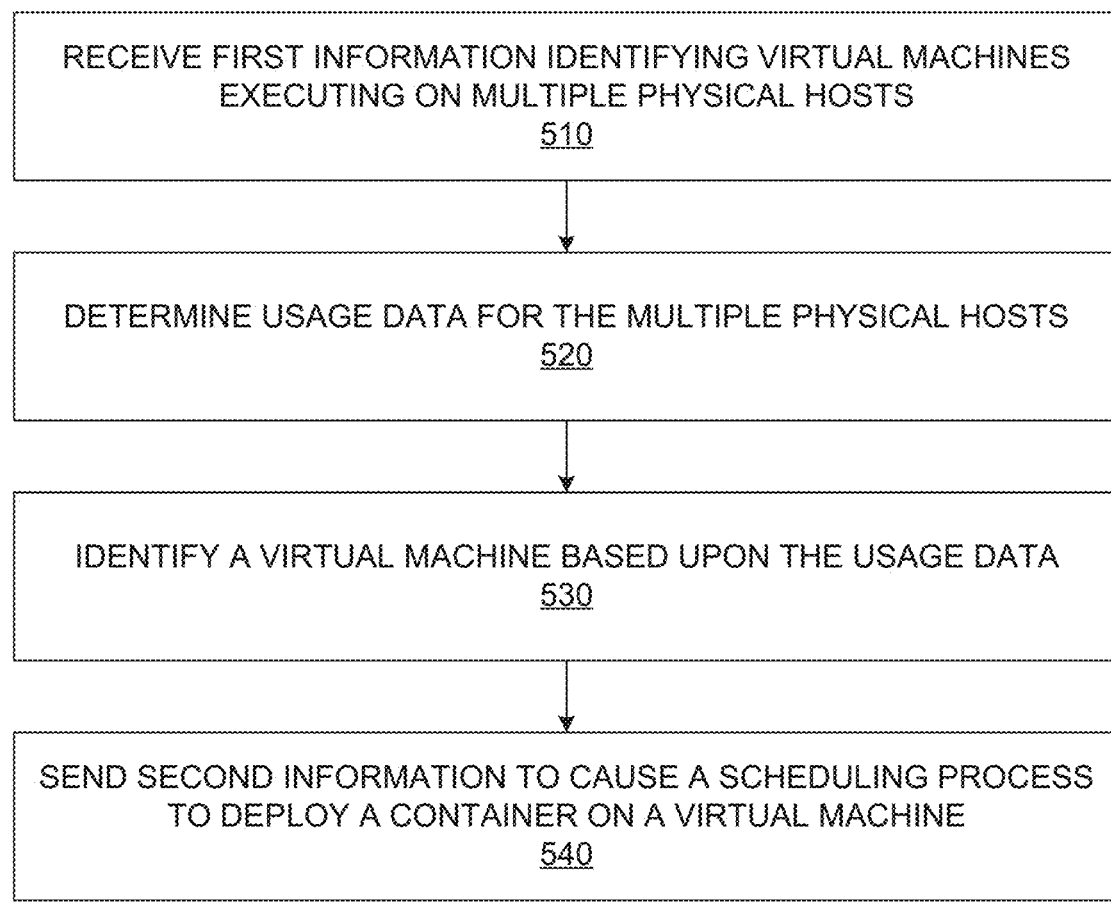
FIG. 5 depicts a process for deploying a container according to certain embodiments described herein.

FIG. 5 depicts process 500 for deploying a container according to certain embodiments described herein. The process depicted in FIG. 5 can be implemented in software (e.g., code, instructions, program, or the like) executed by one or more processing units (e.g., processors cores), in hardware, or using combinations thereof. The software can be stored on a non-transitory computer readable medium (e.g., a memory device, a memory). The particular series of processing steps depicted in FIG. 5 is not intended to be limiting.

In an example operation of the process 500, a second scheduling process (e.g., container scheduler 140) receives first information (e.g., container-level information) (510). In one embodiment, the first information can be received by the second scheduling process (e.g., virtual machine scheduler 120) from the first scheduling process.

The first information can include a list of virtual machines (e.g., first virtual machine 130 and second virtual machine 132, as depicted in FIG. 1) (e.g., first VM 310, second VM 320, and third VM 330, as depicted in FIG. 3B) (e.g., first VM 410 as including a container replica, second VM 420, and third VM 430, as depicted in FIG. 4B).

In some examples, the multiple virtual machines can be identified by the first scheduling process, as described above. For example, the virtual machines can be each virtual machine of a distributed virtualization system executing one or more containers. For another example, the virtual machines can be identified based on one or more policies associated with the first scheduling process. The one or more policies can allow the first scheduling process to determine whether a first virtual machine is a better suited candidate than a second virtual machine based on container information determined by the first scheduling process.

In addition to identifying the virtual machines, the first information can include one or more resource requirements of a container (e.g., first container 150, as depicted in FIG. 1), one or more policies to be used by the second scheduling process, an identification of a type of container running on a virtual machine, an identification of whether a virtual machine includes a replica of the container to be deployed, or any combination thereof. A resource requirement can include an amount of processing (e.g., units of cores), storage (e.g., units of bytes), memory (e.g., units of bytes), time remaining to run (e.g., units of time), or any combination thereof. A policy to be used by the second scheduling process can relate to identifying a virtual machine (e.g., first container 150, as depicted in FIG. 1) based on information associated with a physical host or determined by the second scheduling process.

After receiving the first information, the second scheduling process can identify physical hosts associated with the virtual machines included in the first information. For example, the second scheduling process can identify a first physical host (e.g., first physical host 350, as depicted in FIG. 3B) (e.g., first physical host 440, as depicted in FIG. 4B) executing at least a first virtual machine of the virtual machines identified by the first scheduling process and a second physical host (e.g., second physical host 360, as depicted in FIG. 3B) (e.g., second physical host 450, as depicted in FIG. 4B) executing at least a second virtual machine of the virtual machines identified by the first scheduling process.

Resource utilization data can be determined for each physical host identified by the second scheduling process (520). The resource utilization data can be based on one or more different types of resources, such as processing, memory, storage, network bandwidth resources. For example, the resource utilization data may indicate a percentage of each type of resource used (or unused) for each physical host. In some examples, the resulting percentages can be combined to produce the resource utilization data for a physical host. In other examples, the resulting percentages can be associated with respective weights such that some types of resources are weighted more than others. While the above describes resource utilization data in terms of percentages, it should be recognized that the resource utilization data can indicates amount of used (or unused) resources, rather than percentages. For example, rather than indicating 50% of memory is being used, the resource utilization data can indicate that there is 1 GB of unused memory out of 2 GB total memory. In some examples, the resource utilization data further indicates which containers are deployed on which virtual machines and/or physical hosts, respectively.

In determining the resource utilization data, the second scheduling process can identify that a virtual machine not executing a container is using resources of a physical host (e.g., fourth VM 340, as depicted in FIG. 3B). The resource utilization data can take into account the resources being used by such a virtual machine.

Based on the resource utilization data and the first information, one or more virtual machines (each referred to as a candidate virtual machine) can be identified by the second scheduling process (530). The one or more candidate virtual machines can be included in the multiple virtual machines (which were included in the first information).

The one or more candidate virtual machines can be identified by first identifying one or more physical hosts of the multiple physical hosts based on the resource utilization data. For example, a physical host can be identified when the physical host (1) has the least resources being used, (2) is consuming an amount of resources within a resource threshold (e.g., an amount (or a multiplier of the amount) of resources defined in the one or more resources requirements of the container), (3) does not include a replica of the container to be deployed, or (4) any combination thereof.

In some examples, each virtual machine executing on the one or more identified physical hosts can be identified as a candidate virtual machine. In other examples, the one or more candidate virtual machines can be identified at random from virtual machines (of the multiple virtual machines) running on the one or more identified physical host (e.g., a particular number of randomly selected virtual machines from each identified physical host). In other examples, the one or more candidate virtual machines can be identified using one or more policies associated with the second scheduling process, as described.

Thereafter, the second scheduling process provides second information to the first scheduling process. Based on the second information, the first scheduling process deploys a container (e.g., first container 150, as depicted in FIG. 1) on a virtual machine of the multiple virtual machines (540) based on information associated with a physical host.

In some examples, the second information can identify a single candidate virtual machine such that the container is deployed on the candidate virtual machine. In other examples, the second information can include a list of candidate virtual machines. When receiving the list, the first scheduling process can use the one or more policies associated with the first scheduling process described above (or one or more different policies that are again associated with the first scheduling process) to determine a virtual machine from the list to deploy the container. In other examples, the second information can include a ranking of virtual machines determined by the second scheduling process. In such examples, the first scheduling process can identify a virtual machine based on the ranking determined by the first scheduling process and, optionally, the ranking determined by the second scheduling process as described with respect to step 510. For example, a virtual machine having a highest aggregated rank in view of respective rankings of the first and second information may be selected.

Figure 6:
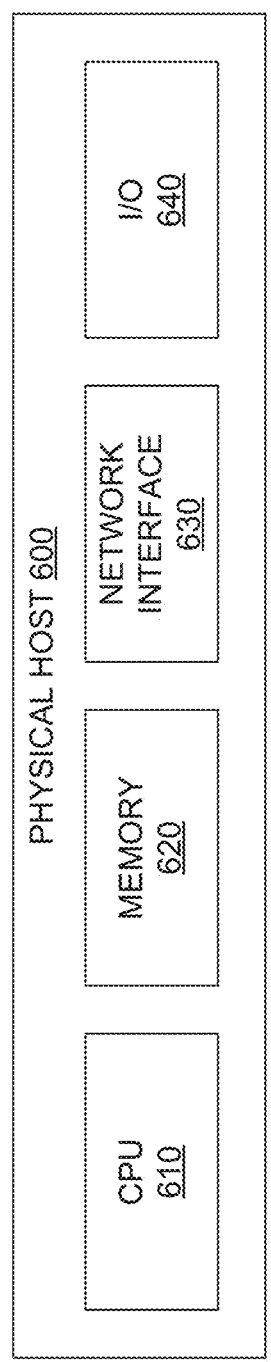
FIG. 6 depicts a physical host according to certain embodiments described herein.

FIG. 6 depicts physical host 600 according to certain embodiments described herein. Physical host 600 can include one or more processors (e.g., central processing unit 610), memory 620, network interface 630, and various I/O interfaces/devices 640. Memory 620 can include random access memory (RAM), including but not limited to volatile RAM (e.g., DRAM, SRAM) and non-volatile RAM (e.g., NAND). Memory 620 can further include computer-readable storage medium. The computer-readable storage medium is, for example, tangible and non-transitory. For example, memory 620 includes high-speed random access memory and also includes non-volatile memory, such as one or more magnetic disk storage devices, flash memory devices, or other non-volatile solid-state memory devices. In some embodiments, the computer-readable storage medium of memory 620 can store instructions for performing the methods and processes described herein. In some embodiments, physical host 600 also includes other components, including power supplies, internal communications links and busses, peripheral devices, controllers, and other components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method, comprising:
transmitting, to a first scheduling process from a second scheduling process, first information identifying a plurality of virtual machines executing on a plurality of physical hosts, wherein the first scheduling process has access to resource utilization data for only virtual machines of the plurality of virtual machines that are executing at least one container;
receiving, from the first scheduling process by the second scheduling process, second information identifying one or more virtual machine of the plurality of virtual machines as a virtual machine candidate on which to deploy a first container; and
deploying the first container on a virtual machine of the one or more virtual machines of the plurality of virtual machines, wherein the second scheduling process has access to the resource utilization data for each physical host of the plurality of physical hosts.

2. The method of claim 1, wherein the second scheduling process is a virtual machine scheduling process, and wherein the first scheduling process is a container scheduling process.

3. The method of claim 1, wherein the first information includes a resource requirement of a container to be deployed.

4. The method of claim 1, wherein the first information includes a policy associated with the first scheduling process, and wherein the policy relates to identifying a virtual machine to be used to deploy a container.

5. The method of claim 1, wherein the first information includes a ranking of the plurality of virtual machines.

6. The method of claim 5, wherein the ranking is determined by the first scheduling process.

7. The method of claim 1, wherein the second information further identifies one or more other virtual machines.

8. The method of claim 7, wherein the second information includes a ranking of the identified virtual machine and the one or more other identified virtual machines.

9. The method of claim 1, wherein the plurality of virtual machines are identified by the first scheduling process.

10. The method of claim 1, wherein the second scheduling process is executing on a virtual machine separate from the plurality of virtual machines.

11. The method of claim 10, wherein the virtual machine executing the second scheduling process is executing on a physical host separate from the plurality of physical hosts.

12. The method of claim 1, wherein the second scheduling process is executing on a virtual machine of the plurality of virtual machines.

13. The method of claim 1, wherein each of the plurality of virtual machines are configured to execute one or more containers.

14. A non-transitory computer readable medium storing one or more programs, the one or more programs comprising instructions, which when executed by a system, cause the system to:
transmit, to a first scheduling process from a second scheduling process, first information identifying a plurality of virtual machines executing on a plurality of physical hosts, wherein the first scheduling process has access to resource utilization data for only virtual machines of the plurality of virtual machines that are executing at least one container;
receive, from the first scheduling process by the second scheduling process, second information identifying one or more virtual machine of the plurality of virtual machines as a virtual machine candidate on which to deploy a first container; and
deploy the first container on a virtual machine of the one or more virtual machines of the plurality of virtual machines, wherein the second scheduling process has access to the resource utilization data for each physical host of the plurality of physical hosts.

15. The non-transitory computer readable medium of claim 14, wherein the first scheduling process is responsible for optimizing resource utilization across virtual machines that are dedicated to run containers.

16. The non-transitory computer readable medium of claim 14, wherein the first information includes a resource requirement of a container to be deployed.

17. The non-transitory computer readable medium of claim 14, wherein the first information includes a policy associated with the scheduling process, wherein the policy relates to identifying a virtual machine to be used to deploy a container.

18. The non-transitory computer readable medium of claim 14, wherein the first information includes a ranking of the plurality of virtual machines, and wherein the ranking is determined by the scheduling process.

19. A system comprising:
one or more processors;
memory; and
one or more programs, wherein the one or more programs are stored in the memory and configured to be executed by the one or more processors, the one or more programs including instructions for:
transmit, to a first scheduling process from a second scheduling process, first information identifying a plurality of virtual machines executing on a plurality of physical hosts, wherein the first scheduling process has access to resource utilization data for only virtual machines of the plurality of virtual machines that are executing at least one container;
receive, from the first scheduling process by the second scheduling process, second information identifying one or more virtual machine of the plurality of virtual machines as a virtual machine candidate on which to deploy a first container; and
deploy the first container on a virtual machine of the one or more virtual machines of the plurality of virtual machines, wherein the second scheduling process has access to the resource utilization data for each physical host of the plurality of physical hosts.

* * * * *